Aug. 17, 1965 M. J. SCHMITZ 3,201,519

AUTOMATIC TELEPHONE EXCHANGES HAVING A SUBSCRIBER'S MEMORY

Filed June 9, 1961 8 Sheets-Sheet 1

INVENTOR
MATTHEUS J. SCHMITZ
BY Frank R. Trifari
AGENT

AUTOMATIC TELEPHONE EXCHANGES HAVING A SUBSCRIBER'S MEMORY
Filed June 9, 1961
| I | II |
|---|---|
| 1 → 1 | 1 → 3 + b |
| 2 → 4 + a | 2 → 2 + c |
| 3 → 3 | 3 → 3 + c |
| 4 → 4 | 4 → 4 + c |
| 5 → 1 | 5 → 3 + b |
| 6 → 6 | 6 → 6 + c |
| 7 → 7 | 7 → 7 + c |
| 8 → 8 | 8 → 8 + c |
FIG. 2
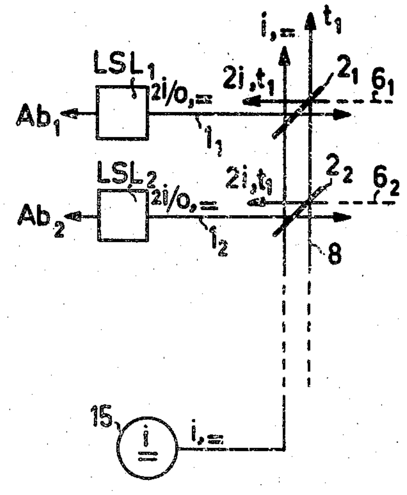
FIG. 3
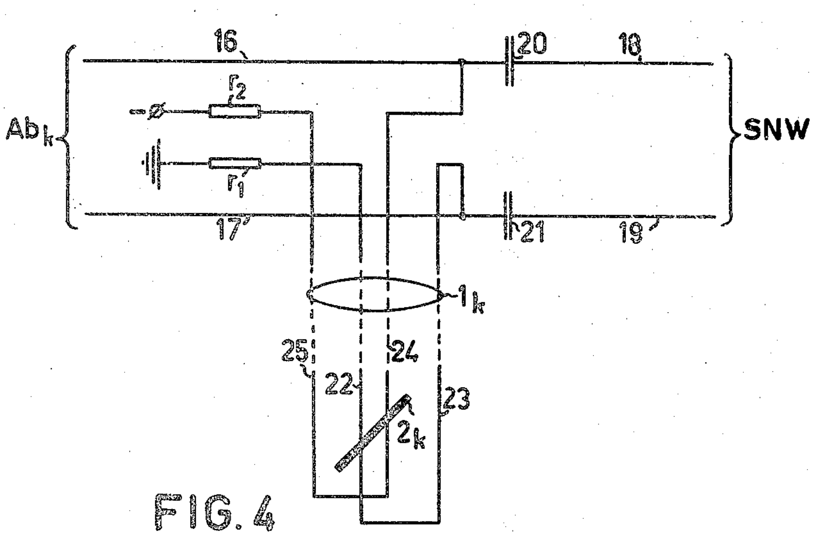
FIG. 4
INVENTOR
MATTHEUS J. SCHMITZ
BY
Frank R. Jeifani
AGENT Aug. 17, 1965 M. J. SCHMITZ 3,201,519
AUTOMATIC TELEPHONE EXCHANGES HAVING A SUBSCRIBER'S MEMORY
Filed June 9, 1961 8 Sheets-Sheet 3
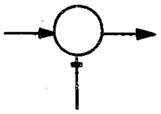
FIG.5
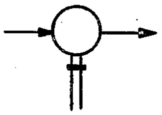
FIG.6
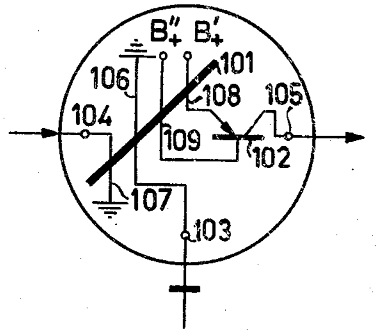
FIG.7
| | I | II |
|---|---|---|
| 1 | 0000→000 | 0000→110+b |
| 2 | 1000→110+a | 1000→000+c |
| 3 | 0110→110 | 0110→110+c |
| 4 | 1110→110 | 1110→110+c |
| 5 | 0101→000 | 0101→110+b |
| 6 | 1101→101 | 1101→101+c |
| 7 | 0011→011 | 0011→011+c |
| 8 | 1011→011 | 1011→011+c |
FIG.8
INVENTOR
MATTHEUS J. SCHMITZ
BY
[signature]
AGENT

AUTOMATIC TELEPHONE EXCHANGES HAVING A SUBSCRIBER'S MEMORY

Filed June 9, 1961 8 Sheets-Sheet 4

INVENTOR
MATTHEUS J. SCHMITZ
BY
AGENT

Aug. 17, 1965 M. J. SCHMITZ 3,201,519

AUTOMATIC TELEPHONE EXCHANGES HAVING A SUBSCRIBER'S MEMORY

Filed June 9, 1961 8 Sheets-Sheet 5

INVENTOR
MATTHEUS J. SCHMITZ.
BY
Frank R. Trifari
AGENT

INVENTOR
MATTHEUS J. SCHMITZ
BY Frank R. Jifan
AGENT

INVENTOR
MATTHEUS J. SCHMITZ.
BY
Frank R. Jifani
AGENT

INVENTOR
MATTHEUS J. SCHMITZ.
BY Frank R. Trifari
AGENT 3,201,519
AUTOMATIC TELEPHONE EXCHANGES HAVING A SUBSCRIBER'S MEMORY Mattheus Jacobus Schmitz, Hilversum, Netherlands, assignor to North American Philips Company, Inc., New York, N.Y., a corporation of Delaware Filed June 9, 1961, Ser. No. 116,115
Claims priority, application Netherlands, July 12, 1960, 253,715
3 Claims. (Cl. 179—18)

The invention relates to an automatic telephone exchange, in which each subscriber's line in the exchange ends in a line circuit which can signal only the conditions "subscriber's loop open" and "subscriber's loop closed" and which for that purpose is provided with at least one signal wire which conveys this signal. The signal wire is connected to a subscriber's memory in which the conditions of the subscriber's loop are recorded. The exchange is controlled by a control member which receives information from a number of other members of the exchange (such as conncting circuits, registers, etc.), including the subscriber's memory. The control member transmits information recieved, in accordance with the nature of the information, to one of these other members, and the other member, in accordance with its function, reacts to the information by retransmitting new information, derived from the information received, to the control member, or by carrying out the action which is prescribed by the information received. It is known that the line circuit in a telephone exchange centrally controlled by a control member need not perform any other functions but (a) transmitting signals (speech signal, tone signals, ringing signal) from the subscriber's set in question to the speech way switching network and in the reverse direction, (b) supplying a signal which indicates the state (open or closed) of the subscriber's loop in question.

The remaining functions of the line circuits in conventional electro-mechanical automatic telephone exchanges are taken over in an electronic telephone exchange by non-individual members, including the control member. A telephone exchange having central control, however, should comprise a circuit arrangement, hereinafter termed loop test circuit, which scans the line circuit cyclically, detects the state of the subscriber's loop in question (open or closed), and transmits the result of this detection to the central control apparatus. If the exchange does not comprise finder switches, the loop test circuit should also transmit an identification of the subscriber in question to the central control apparatus. In an exchange having finder switches, this is not necessary. Further concentration of controlling is possible by providing exchange with a memory, hereinafter termed subscriber's memory, in which the condition of the subscribers' loops are recorded in storage elements. From the data which are supplied at a definite instant by the loop test circuit and the subscriber's memory, a conclusion may be made concerning operations which must be performed on behalf of the subscriber's set in question. If, for example, the loop test circuit finds out that the loop of a definite subscriber's set is closed, while this subscriber's set is recorded in the subscriber's memory as "free" it follows from this fact that the subscriber's set in question should be given a dial tone. This information is transmitted to the control member to ensure that the required actions are carried out. The invention is based upon the recognition of the fact that a very important saving of apparatus is obtained if the loop-test circuit and the subscriber's memory, which is known exchanges constitute two separate members having their own control circuit arrangements, are combined to form one member having one control circuit arrangement. First of all, this combination has the advantage that the subscriber's memory always supplies the actual state of the subscriber's sets, and has the additional advantage that a number of functions which otherwise would require much additional apparatus can be performed by this combined member, hereinafter termed subscriber's memory, without noteworthy complications. These additional functions may be for example: The blocking of a subscriber in arrears of payment, rendering the control member inaccessible to a subscriber who has lifted his handset without dialling or rendering the control member again accessible to said subscriber, connecting through to a circuit arrangement for staff location (for example a doctor or an information service), and so on. The automatic telephone exchange according to the invention is characterized in that the part of the subscriber's memory individually associated with a subscriber's set comprises an element connected to the signal wire of the relative line circuit. This element indicates the instantaneous condition (open or closed) of the relative subscriber's loop. This part of the subscriber's memory further comprises a number of storage elements which, together with the first mentioned element, can record a number of states of the relative subscriber's set, for example "free" "requires dial tone," "busy," and so on. The part of the subscriber's memory individually associated with the various subscriber's sets are connected to a scannning arrangement (for example a counting circuit) via reading wires and to a logical member via signal and writing wires. The scanning arrangement is constructed so that the information stored in the parts of the subscriber's memory individually associated with the various subscriber's sets are read in a cyclic sequence and transferred to the logical member through the signal wires. In response to the received information, the logical member registers the subscriber's set concerned in a definite state dependent on the information received in the relative part of the subscriber's memory and, if the information received should give rise thereto, ensures that an information derived from the received information and the co-ordinates of the relative line circuit is transmitted to the control member. The transmission of information in cyclic sequence to the logical member may be interrupted by the control member and replaced by the transmission of the information to the logical member about the state in which a subscriber's set indicated by the control member is registered in the subscriber's memory. The logical member reacts to the information by writing a definite new state dependent on the information received in the relative part of the subscriber's memory and ensuring that information derived from the information received and the co-ordinates of the subscriber's set in question is transmitted back to the control member. The reactions of the logical member on receipt of information as a result of the cyclic scanning of a part of the subscriber's memory and as a result of a reading of part of the subscriber's memory initiated by the control member, are different.

In order that the invention may be readily carried into effect, it will now be described in greater detail, by way of example, with reference to the accompanying drawings, in which:

FIG. 2 is a table showing the functions of the logical member of the circuit arrangement shown in FIG. 1;

FIG. 3 illustrates a modification of a portion of the circuit arrangement shown in FIG. 1;

FIG. 4 illustrates a line circuit which may be used in combination with the circuit arrangement;

FIGS. 5, 6 show the symbols for two components which may be employed in the construction of parts of the circuit arrangement shown in FIG. 1;

FIG. 7 is a possible embodiment of the component for which the symbol shown in FIG. 5 is used;

FIG. 8 is a table showing the translation to be performed by the logical member of the circuit arrangement shown in FIG. 1;

Figure 1:
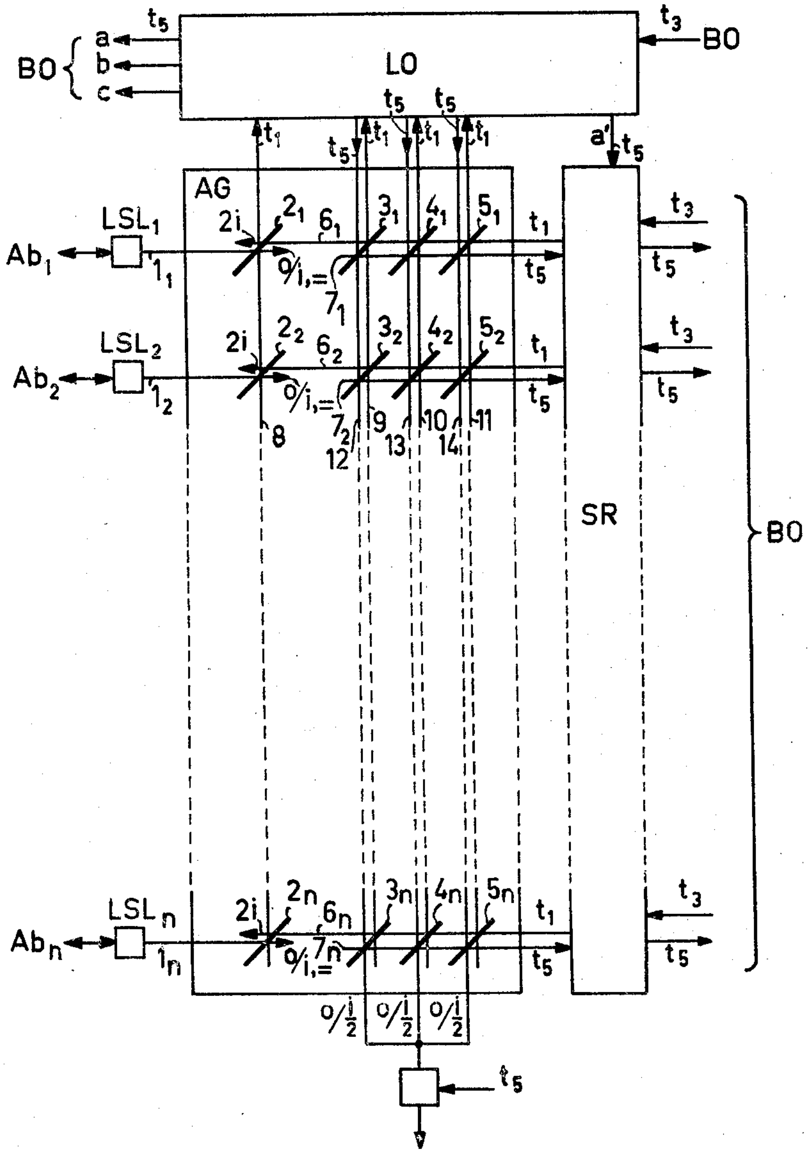
FIG. 1 illustrates the principal components of a circuit arrangement according to the invention.

FIG. 1 shows the principle of the invention. In this figure, $LSL_1$, $LSL_2$, . . . $LSL_n$ are line circuits which are connected, through telephone lines, to subscribers' sets $Ab_1$, $Ab_2$, . . . $Ab_n$ not shown in this figure. The line circuit $LSL_k$ is connected, through a signal wire $\mathbf{1}_k$ to an annular core $\mathbf{2}_k$ consisting of a material having a rectangular magnetic hysteresis loop. This core forms the above element which indicates the instantaneous state of the relative subscriber's loop. The part of the subscriber's memory AG individually associated with the subscriber's set $Ab_k$ in the present example contains another three cores $\mathbf{3}_k$, $\mathbf{4}_k$ and $\mathbf{5}_k$ consisting of a material having a rectangular hysteresis loop. These latter cores serve as storage elements. The line elements are constructed so that a direct current having a strength $i$ passes through the signal wire $\mathbf{1}_k$ when the subscriber's loop in the subscriber's set $Ab_k$ is closed, but that no current passes through the signal wire $\mathbf{1}_k$ when the subscriber's loop in the subscriber's set $Ab_k$ is opened. In this case $i$ is the current strength which is just capable of flipping over the cores $\mathbf{2}_k$, $\mathbf{3}_k$, $\mathbf{4}_k$ and $\mathbf{5}_k$, while a current of the strength $\frac{1}{2}i$ is certainly is not capable of doing this.

The device further comprises a counting circuit or shift register SR which, at the instant $t_1$ of each pulse cycle, conducts, in cyclic sequence, current pulses of at least the strength $2_i$ through the wires $\mathbf{6}_1$, $\mathbf{6}_2$, . . . $\mathbf{6}_n$ and, at the instant $t_5$ of each pulse cycle, conducts current pulses, in cyclic sequence, of the strength $\frac{1}{2}i$ through the wires $\mathbf{7}_1$, $\mathbf{7}_2$, . . . $\mathbf{7}_n$. The wire $\mathbf{6}_1$ is threaded through the cores $\mathbf{2}_k$, $\mathbf{3}_k$, $\mathbf{4}_k$, $\mathbf{5}_k$ so that the current pulses occurring therein is in a direction to set those cores to a magnetic condition which is termed state "0." The wire $\mathbf{7}_k$ is threaded through the cores $\mathbf{3}_k$, $\mathbf{4}_k$, $\mathbf{5}_k$ so that the current pulses occurring therein is in a direction to set those cores to the state 1. The wire $\mathbf{1}_k$ is threaded through the core $\mathbf{2}_k$ so that the direct current occurring therein is in a direction to set that core to the state "1."

Finally, the device comprises a logical member LO which is coupled to all the cores $\mathbf{2}_k$ via a signal wire 8, to all cores $\mathbf{3}_k$ via a signal wire 9, to all cores $\mathbf{4}_k$ via a signal wire 10 and to all cores $\mathbf{5}_k$ via a signal wire 11. Furthermore, the logical member LO is coupled to all the cores $\mathbf{3}_k$ via a write-in wire 12, to all the cores $\mathbf{4}_k$ via a write-in wire 13 and to all the cores $\mathbf{5}_k$ via a write-in wire 14.

The three cores $\mathbf{3}_k$, $\mathbf{4}_k$ and $\mathbf{5}_k$ ($k$=constant) form the above-mentioned store elements individually associated with the subscriber's set $Ab_k$. Therefore, for each subscriber's set $2^3=8$ different states can be recorded in the subscriber's memory. Together with the two states of the ring $\mathbf{1}_k$ also associated individually with the subscriber's set $Ab_k$, this results in sixteen different possibilities of which, however, only eight are used in the example described below. These possibilities are summarized in Table I. The symbol 0000 in this table means that the cores $\mathbf{2}_k$, $\mathbf{3}_k$, $\mathbf{4}_k$, $\mathbf{5}_k$ are all in the state "0," the symbol 0110 that the cores $\mathbf{2}_k$ and $\mathbf{5}_k$ are in the state "0" but the cores $\mathbf{3}_k$ and $\mathbf{4}_k$ in the state "1," and so on.

SURVEY OF STATES WHICH CAN BE RECORDED

*Table I*

| | | |
|---|---|---|
| 1 | 0000 | Free. |
| 2 | 1000 | Requires dialling tone. |
| 3 | 0110 | Is dialling or is called or has replaced the receiver after a call. |
| 4 | 1110 | Is dialling or is busy. |
| 5 | 0101 | Has replaced the hand set after having lifted it and being registered in the state 6. |
| 6 | 1101 | Has lifted the hand set without dialling. |
| 7 | 0011 | Subscriber in arrears of payment (hand set replaced). |
| 8 | 1011 | Subscriber in arrears of payment (hand set lifted). |

Insofar as the cores $\mathbf{3}_k$, $\mathbf{4}_k$ $\mathbf{5}_k$ are concerned, a 2-out-of-3-code is used in this case in order to simplify the construction of the logical member LO but is not essential.

The logical member LO may transmit three kinds of signals to the control member of the exchange, which signals are termed $a$, $b$, and $c$ and the meaning of which is described in Table II.

SIGNALS FROM THE LOGICAL MEMBER TO THE CONTROL MEMBER

*Table II*

$a$=subscriber's set requires dial tone
$b$=called subscriber's set is free
$c$=called subscriber's set is busy The device operates as follows. Assume that the shift register SR conducts a current pulse of the strength $2i$ through the wire $\mathbf{6}_k$ at the instant $t_1$ of a pulse cycle. As a result of this, the cores $\mathbf{2}_k$, $\mathbf{3}_k$ $\mathbf{4}_k$ and $\mathbf{5}_k$ are read, in other words the logical member receives information about the state of the subscriber's set $Ab_k$. It reacts to it by writing back a new state of that subscriber's set adapted to this information in the subscriber's memory AG, and, if the information received should give rise thereto, by transmitting the signal $a$ to the control member of the exchange. This writing back takes place at the instant $t_5$ of the same pulse cycle by coincidence. For example, if the logical member has received the information that $Ab_k$ is in the state 2 (i.e., in the states shown in Table II), this subscriber's set is written in the state 4, while the signal $a$ is transmitted to the control member of the exchange. If the logical member contains the information that $Ab_k$ is in the state 5, this subscriber's set is written in the state 1, but no signal is transmitted to the control member of the exchange. In the other cases, the logical member reacts by writing back the subscriber's set in the original state and transmitting no signal to the control member of the exchange. These reactions are summarised in column I of the table shown in FIGURE 2. In this table, the symbol $2\rightarrow 4+a$ for example constitutes the order "write the relative subscriber's set in the state 4 and transmit the signal $a$ to the control member," when the logical member receives a signal that the subscriber's set is in state 2. During the following pulse cycle, the subscriber's set $Ab_{i+1}$ is treated in a corresponding manner, while the subscriber's set $Ab_1$ again follows on the subscriber's set $Ab_n$. In FIGURE 1 it is assumed that in case a subscriber's set is to be given dial tone, not only the signal $a$ but also the identification of that subscriber's set is transmitted to the control member BO. This latter is effected by the counting circuit SR, so that this member, in case the control member receives the signal $a$, should receive a signal $a'$ with the information "transmit the identification of the subscriber's set just scanned to the control member."

However, it may also happen that the control member of the exchange requests information regarding the state of a specific subscriber's set $Ab_s$. This may occur, for example, when the subscriber's set $Ab_s$ is called by another subscriber's set. In this event, the control member should know whether the subscriber's set called is free or busy, since the possibility of a connection to that subscriber's set is dependent upon the state of the set $Ab_s$. In this case, the counting circuit SR of the control member receives the identification of the subscriber's set called and reacts to it by normally finishing the scanning cycle of the subscriber's set under treatment, but, in the following pulse cycle, switching to the subscriber's set $Ab_s$ called. The logical member LO again reacts to the information received by writing back a new state of that subscriber's set adapted to this information in the subscriber's memory AG and informing the control member whether the subscriber's set called is free (signal $b$) or busy (signal $c$). Using the previously explained symbols, column II of the table in FIGURE 2 shows the reactions of the logical member LO in the case of a question originating from the control member in behalf of a connection asked for. It appears from the table in FIGURE 2 that the reactions of the logical member are different in these two cases, so that the logical member should receive a signal from the control member indicating whether the information received from the subscriber's memory is a result of the cyclic scanning of the subscriber's sets or of a question originating from the control member. It is assumed that, with respect to the signal which contains the subscriber's identification, this signal is shifted through a pulse cycle and consequently occurs in the pulse cycle in which the logical member should react to the question. This shift through a pulse cycle may of course also take place in the logical member itself.

The circuit arrangement shown in FIGURE 1 has the disadvantage that the core $2_k$ indeed without delay assumes the state which indicates that the loop in the subscriber's set $ab_k$ is closed, but on an average assumes the state which indicates that this loop is opened again only after half a scanning cycle, so that, when reading the subscriber's memory, sometimes a wrong item of information is received (e.g., state 6 instead of state 5) which is a particular disadvantage when the reading originates from the control member.

This disadvantage may be avoided by using the circuit arrangement shown in FIGURE 3, in which a pre-magnetization current of the strength $i$ supplied by a direct voltage source 15 is used. FIGURE 4 shows a line circuit which may be used in the circuit arrangement shown in FIGURE 1. In this figure, the reference numerals 16 and 17 are the two subscriber's lines extending to the subscriber's set in question, and 18 and 19 are the two wires extending to the speech way network SWN. The wires 16 and 18 are coupled together by a capacitor 20, the wires 17 and 19 by a capacitor 21. The wire 16 is connected to a source of negative voltage through the signal wires 24 and 25 and the resistor $r_2$, the wire 17 is connected to earth through the signal wires 23 and 22 and the resistor $r_1$. The signal wires 22 and 24 extend through the wire $2_k$ associated with the relative subscriber's set. The four signal wires 22–25 together form the line $1_k$ of FIG. 1. If the subscriber's loop is closed, current passes through the path earth, resistor $r_1$, wire 22, wire 23, wire 17, closed subscriber's loop in subscriber's set, wire 16, wire 24, wire 25, resistor $r_2$, source or negative voltage. This is the current $i$ which sets the core $2_k$ to the state 1. If the subscriber's loop is opened, no current flows through the above path. The circuit arrangement shown in this figure has the advantage of being insensitive to longitudinal interferences in the subscriber's lines. Longitudinal interferences are interference voltages and interference currents in the lines, which have the same sense with respect to both lines. A longitudinal interference current in the subscriber's lines causes oppositely directed currents in the wires 22 and 24 which extend through the core $2_1$ so that these currents are neutralized as far as the effect on the core $2_k$ is concerned.

When the circuit arrangement shown in FIGURE 4 presents difficulties owing to the spreading in the current through the subscribers' loops, the direct current flowing through the subscriber's loop may of course also be used for opening a gate in the signal wire. FIGURE 5 shows the symbol for a very practicable component for the counting circuit and the logical member, hereinafter termed storing pulse generator. By this is understood a circuit arrangement having a setting terminal, an input terminal and an output terminal, which supplies an output pulse only when first a pulse of a definite polarity and sufficient strength is conducted to the setting terminal (the setting of the pulse generator) and then a pulse of a definite polarity and sufficient strength is conducted to the input terminal (the firing of the pulse generator). The setting of a pulse generator already set has no effect, nor has the firing of a pulse generator which has already been fired and has not been set again. In the drawing, the setting terminal is indicated by a cross-line through the line extending to the terminal, the input terminal by an arrow pointing towards the circle representing the pulse generator, and the output terminal by an arrow pointing away from that circle. A pulse generator may also comprise two or more setting terminals and two or more input terminals. If the pulse generator is constructed so that it can only be brought into the set state by simultaneously conducting a pulse to two of its setting terminals (setting by coincidence), these two setting terminals are said to be coupled. FIGURE 6 shows the symbol for a storing pulse generator having two coupled setting terminals. FIGURE 7 shows an example of a circuit arrangement of a storing pulse generator, drawn within the symbol used for it. In this figure, 101 is an annular core of a material having a rectangular magnetic hysteresis loop, 102 a pnp transistor, 103 a setting terminal, 104 the input terminal, 105 the output terminal, 106 a setting winding of the core 101 connected to the setting terminal, 107 a firing winding of the core 101 connected to the input terminal, 108 a feedback winding of the core 101 connected on the one side to a positive voltage source, $B_+'$ and on the other side to the emitter of the transistor 102, and 109 a control winding connected on the one side to a second positive voltage source $B_+''$ possibly coinciding with the first voltage source and on the other side to the base of the transistor 102. The collector of the transistor 102 is connected to the output terminal 105. The voltages of the voltage sources $B_+'$ and $B_+''$ are so chosen that the transistor 102 normally is non-conductive.

The circuit of FIG. 7 operates as follows. Assume, a current pulse is conducted to the setting terminal 103. Then the core 101 is brought in a magnetic condition which is termed state 1. If the core 101 is in this state, the pulse generator is set. If a pulse is conducted to the input terminal 104, the core 101 starts flipping back to the state 0, as a result of which a voltage is induced in the control winding 109 which renders the base of the transistor 102 negative with respect to the emitter. As a result, the transistor becomes conductive and the pulse generator delivers an output pulse. The resulting current through the feedback winding 108 supports the effect of the input pulse and may even take it over if the input pulse is already finished before the core 101 has reached the state 1. By a suitable dimensioning it may be achieved that the output pulse has a sharply defined duration and amplitude substantially independent of the nature of the input pulse.

Figure 9:
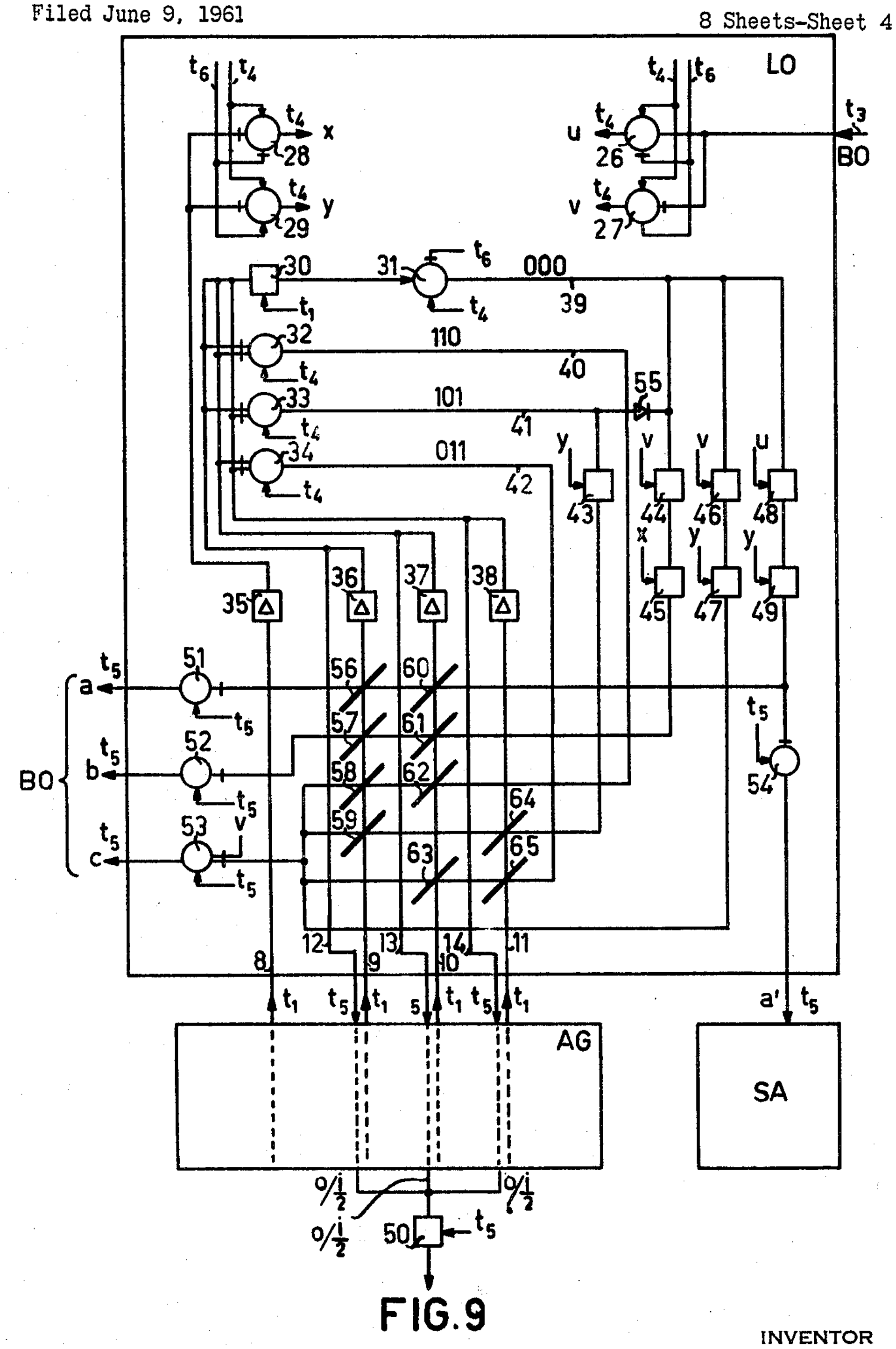
FIG. 9 illustrates a circuit that may be employed for the logical member.

As already noted, the logical member LO should react in two different manners depending upon whether the information received is a result of the normal scanning of the line circuits or a result of a question from the control member. In fact this means that the logical member is a translator which receives code groups with 5 code element positions (corresponding to the states of the cores $2_k$, $3_k$, $4_k$, $5_k$ and to the fact whether this code group is originated by a question of the control member or not) and which converts these code groups into code groups having 7 code element positions (corresponding to the write back pulses of the cores $3_k$, $4_k$, $5_k$ and the signal $a$, $a'$, $b$, $c$). So the logical member may be constructed according to known principles. FIGURE 8 shows the translations which the logical member should carry out in a corresponding manner as in FIGURE 2, indicating the code elements, and FIGURE 9 shows a possible embodiment of this member using the fact that the cores $3_k$, $4_k$, $5_k$ supply a 2-out-3-code. It is assumed that the logical member, in the case of a question originating from the control member BO, receives a pulse at the instant $t_3$ of the pulse cycle following that in which the counting circuit SR receives the subscriber's identification from the control member BO. The presence or absence of this pulse is converted in two storing pulse generators 26, 27 into a pulse $u$ or a pulse $v$, the pulse $u$ being present and the pulse $v$ being absent if the logical member receives no pulse from the control member, while the pulse $u$ is absent but the pulse $v$ is precent if the logical member does receive a pulse from the control member. At the instant $t_6$ of the preceding pulse cycle, the pulse generators 26 and 27 are set to the states 1 and 0 (1 means "set," 0 means "not set"). Depending upon whether the logical member at the following instant $t_3$ receives a pulse from the control member BO or does not receive a pulse, the pulse generators 26 and 27 are set in the states 0, 1, or 1, 0 respectively. In the first case, the pulse generator 27 delivers a pulse at the instant $t_4$ with the information "the incoming code group is initiated by a question from the control member" and in the second case, the pulse generator 26 supplies a pulse $u$ at the instant $t_4$ with the information "the incoming code group is the result of a normal scanning." In a corresponding manner the storing pulse generators 28 and 29 convert the signal supplied by a core $2_k$ (pulse or no pulse) into a signal $x$ which contains a pulse at the instant $t_4$ if the relative subscriber's loop is open (core $2_k$ has not delivered a pulse) but does not contain a pulse at the instant $t_4$ if that subscriber's loop is closed (core $2_k$ has delivered a pulse) and a signal $y$ which contains a pulse if the signal $x$ does not contain a pulse (subscriber's loop closed) but contains no pulse if the signal $x$ contains a pulse (subscriber's loop open). The code group (000, 110, 101, or 011) supplied by the core, $3_k$, $4_k$, $5_k$, is converted into a pulse on one of the wires 39, 40, 41 and 42 by a gate 30 opened only at the instant $t_1$, a pulse generator with memory 31 and three pulse generators with memories 32, 33, and 34 which can be set in coincidence. Because the pulses immediately supplied by the cores $2_k$, $3_k$, $4_k$, $5_k$ are too weak to control the pulse generators and gates, these pulses are amplified in the pulse amplifiers 35, 36, 37 and 38. If none of the cores $3_k$, $4_k$, $5_k$ has supplied a pulse at the instant $t_1$ the pulse generator 31 set at the instant $t_6$ delivers the pulse at the instant $t_4$. However, if one of these cores has delivered a pulse at the instant $t_1$, it passes the open gate 30 and fires the pulse generator 31, as a result of which the latter does no longer supply a pulse at the instant $t_4$. If the cores $3_k$ and $4_k$ have supplied a pulse, the pulse generator 32 is set in coincidence and delivers a pulse at the instant $t_4$. Something analogous holds for the pulse generators 33 and 34. The logical member further comprises a number of g ates 43–50, pulse generators with memories 51–54 and cores 56–65 which convert the code groups of the 1-out-of-4-code present in the wires 39, 40, 41, 42 at the instant $t_4$ of the pulse cycles into the desired code groups to be delivered at the instant $t_5$. The diode 55 serves in known manner for a necessary decoupling. Suppose, for example, that the wire 41 contains a pulse at the instant $t_4$ (ring $3_k$ in state 1, ring $4_k$ in state 0, ring $5_k$ in state 1; state 5 or 6 in table of FIGURE 8). If the pulse generator 29 delivers a pulse 4 at this instant, that is to say if the subscriber's loop is closed (state 6 in the table of FIGURE 8), the pulse supplied by the pulse generator 33 passes the gate 43, sets the cores 59 and 64 in state 1 and sets the pulse generator 53 in coincidence if the pulse generator 27 has delivered a pulse $v$ (question of the control member) but does not set the pulse generator 53 owing to the failure of a coincident if the pulse $v$ is absent (normal scanning). At the following instant $t_5$, all the cores 56–65 are set to the state 0 by a pulse in a wire (not shown to simplify the figure) which is threaded through these cores, while at the same time all the pulse generators 51–54 are fired. Now the cores 59 and 64 both deliver a pulse, which pulses are conducted to the subscriber's memory AG via the pulse amplifiers 36 and 38, the wires 12, 14 and the gate 50 now opened, and set the cores $3_k$ and $5_k$ to the state 1 in coincidence with the pulse in the wire $7_k$ (FIGURE 1) delivered by the shift register SR at that instant $t_5$. However, the pulse generator 53 only delivers a pulse $c$ if the pulse $v$ has been present, so if there has been a question from the control member. On the other hand, if the pulse generator 29 delivers a pulse $x$ at the instant $t_4$, that is to say if the subscriber's loop is opened (state 5 in the table of FIGURE 8), the pulse delivered by the pulse generator 33 passes the gates 44 and 45 if the pulse $v$ is present (question of the control member) but is stopped by gate 44 if the pulse $v$ is absent (normal scanning). In the first case, the cores 57, 61 are set to the state 1 and the pulse generator 52 is set. At the following instant $t_5$, the cores 57 and 61 consequently both supply a pulse, which pulses are conducted, via the pulse amplifiers 36, 37, the wires 12, 13 and the gate 50 now opened, to the subscriber's memory AG, and set the cores $3_k$ and $4_k$ to the state 1 in coincidence with the pulse in the wires $7_k$ supplied by the shift register SR at the instant $t_5$. At the same time, the pulse generator 52 now supplied a pulse $b$. In the second case, the pulse supplied by the pulse generator 33 is stopped by the gates 43 and 44. The cores $3_k$, $4_k$ and $5_k$ consequently remain all three in the state 0 and the pulse generator 52 does not deliver pulse $b$. This is quite in agreement with the translation demanded by the table of FIGURE 8. It is easy to find out that also the other code groups are correctly translated.

Figure 10:
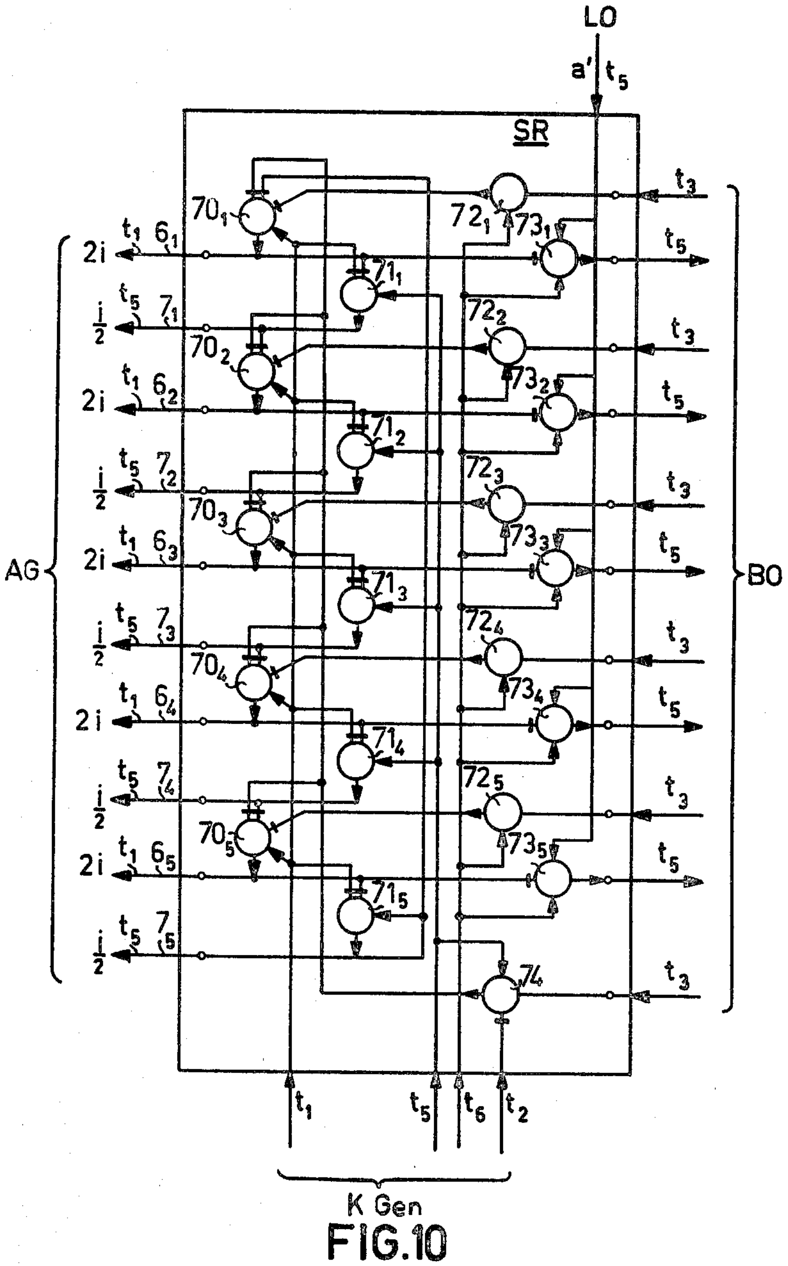
FIG. 10 illustrates a circuit that may be employed for the shift register in the arrangement of FIG. 1.

FIGURE 10 shows a counting circuit built up from storing pulse generators. The operation of this counting circuit (which for simplifying the drawings is restricted to 5 stages) is substantially equal to that of a so-called Wang-line. At the beginning of a pulse cycle, of all the pulse generators only one of the pulse generators $70_1$, $70_2$, $70_3$, $70_4$ or $70_5$ is in the set state, for example the pulse generator $70_k$ ($k=1, 2, \ldots, 5$). At the instant $t_1$, this pulse generator is fired, so the wire $6_k$ contains a pulse, and the pulse generators $70_k$ and $73_k$ are set. At the instant $t_2$, the pulse generator 74 is set. At the instant $t_5$, the pulse generators $71_k$ and 74 are fired, as a result of which the pulse generator $70_{k+1}$ is set by the coincidence of the pulses delivered by the pulse generators 74 and $71_k$. At the instant $t_6$, the pulse generator $73_k$ is fired, but the control member BO should be constructed so that it does not interpret a pulse received at an instant $t_6$ as information. Now this cycle of events is repeated. So far it has been assumed that the counting circuit has not received a pulse $a'$ from the logical member LO. If it has received a pulse from the logical member the pulse generator $73_k$ is fired at the instant $t_5$ and the pulse delivered as a result is interpreted by the control member as a subscriber's identification. The cycle of events still becomes somewhat different if the counting circuit receives two pulses from the control member BO at the instant $t_3$, one of which sets the pulse generator $72_r$ and the other of which fires the pulse generator 74. The pulse delivered by this latter pulse generator, however, has no effect because there is no coincidence supplied by a pulse generator $70_s$. At the instant $t_5$, the pulse generator $71_k$ is fired indeed, but the pulse generator $70_{k+1}$ is not brought to the set because now the coincident to be supplied by the pulse generator 74 fails. At the instant $t_6$, the pulse generator $72_r$ is fired and the pulse generator $70_r$ is consequently set. The shift register consequently switches from the pulse generator $70_k$ to the pulse generator $70_r$. The various clock pulses are supplied by a clock pulse generator KG*en*.

The technique used in this case is a current technique. For simplifying the drawing, the required series arrangements are shown as parallel arrangements. In addition it is clear that one is not restricted to the code used, nor the number of cores per subscriber's set. In addition to those mentioned, naturally also a number of other individual wishes or indications of the subscriber's sets may be registered in the subscriber's memory such, for example, as "must switch over to a circuit for staff location," for example a doctor "must switch over to this or that information service," and so on. Of course, these additional possibilities should be registered in the form of code groups, for which more than three memory elements per subscriber's set may be required, but this does not present any fundamental difficulty. It is true, the logical member becomes more complicated by it, but since this member is a translator, this does not present any fundamental difficulties either. The further control of the exchange, in particular its control member, should naturally be capable of effectively processing the relative additional facilities, but this is outside the above scope of the invention. Finally, it is pointed out that the logical member performs part of the automatic control functions for the control of the exchange, that is to say those functions for which making a decision is necessary. This means that the logical member takes over a part of the control otherwise concentrated in the control member and this may be effected to a greater or lesser extent.

Figure 11:
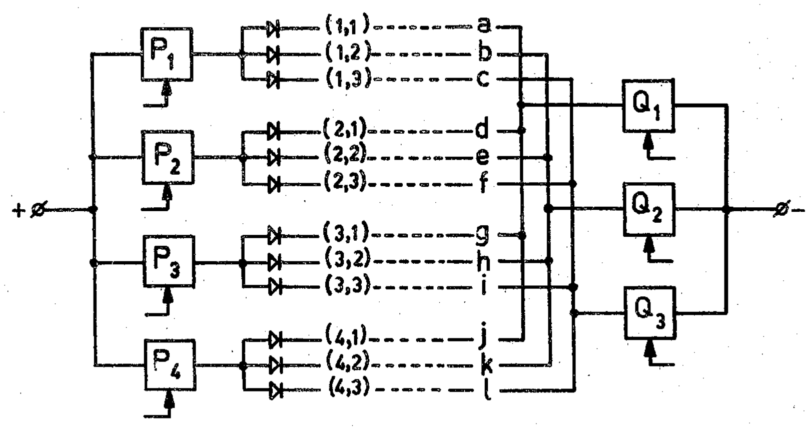
FIGS. 11, 12 and 13 illustrates three methods by which the control of the reading of and writing back in the subscriber's memory can be simplified.
Figure 12:
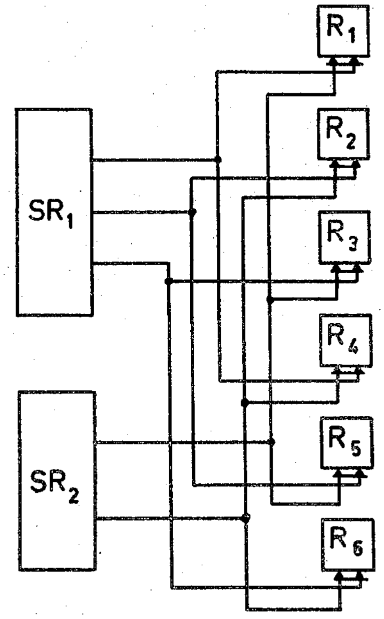

A disadvantage of the above described circuit arrangement is that the counting circuit becomes very long in the case of large numbers of subscriber's sets connected. The problem in this case is to provide a circuit arrangement which renders it possible to conduct in a cyclic sequence a current pulse through each time one of a large number of wires and which renders it possible also to conduct a current pulse through any of those wires. In the telecommunication technique several solutions for this problem are known. The principle of one of them is shown in FIGURE 11. The wires in question are in this case the twelve wires *a, b, c, d, e, f, g, h, i, j, k, l*. These may also be indicated by twelve groups of each time two numbers $(x, y)$ where $x$ may assume every one of the values 1, 2, 3, 4 and $y$ every one of the values 1, 2, and 3. The wire $a$ is then indicated by the symbol (1, 1), the wire $b$ by the symbol (1, 2) and so on. The wires $(k, 1)$, $(k, 2)$, $(k, 3)$ are connected on the left to the output of a gate $P_k$; the wires $(1, r)$, $(2, r)$, $(3, r)$, $(4, r)$ are connected on the right to a gate $Q_r$. Each of the twelve wires contains in addition a diode. If the gates $p_k$ and $Q_r$ are opened, current can flow through the wires $(k, r)$ only. The pulses which open the gate $P_i$ and $Q_i$ can be delivered by counting circuits of the type shown in FIGURE 10. In the case of normal scanning, the wires conduct current in the sequence: $a=(1, 1)$, $e=(2, 2)$, $i=(3, 3)$, $j=(4, 1)$, $b=(1, 2)$, $f=(2, 3)$, $g=(3, 1)$ and so on. In order to avoid undesired periodicities shorter than 12, the numbers of outputs of the counting circuits which control the gates $P_i$ and $Q_j$ should be indivisible mutually. The concentration of the control may be carried through even further by controlling the gates in coincidence, in which each time one coincident is delivered by a first counting circuit $SR_1$ and the second coincident by a second shift counting circuit $SR_2$ (FIG. 12). The numbers of outputs of these two counting circuits should again be indivisible mutually. That an actual saving of material is obtained in this manner appears from the following example. Suppose one has an exchange with 10,000 connections. Without concentration in the control, the 10,000 pairs of wires of the subscriber's memory may be controlled by a counting circuit with 10,000 pairs of outputs. If single concentration in the control is used, the 10,000 pairs of wires are divided into 100 groups of each 100 pairs of wires, so that then two groups of each 100 gates are necessary, one group of which may be controlled by a counting circuit having 100 pairs of outputs and the other group by a counting circuit having 101 pairs of outputs, of which, however, one pair of outputs is not used. In order to avoid an undesired shortening of the periodicity, the numbers of pairs of outputs of the two shift registers may not have a common division. If double concentration in the control is used by controlling the gates in coincidence, one group of 100 gates may be controlled by two counting circuits having 10 and 11 pairs of outputs respectively and the other group of 100 gates by two counting circuits having 9 and 13 pairs of outputs respectively. So one has the following possibilities:

No concentration: counting circuit having 10,000 pairs of outputs but no gates and no diodes Single concentration: two countnig circuits having 100 and 101 pairs of outputs respectively, 200 gates and 10,000 diodes Double concentration: four counting circuits having 9, 10, 11 and 13 pairs of outputs respectively, 200 gates and 10,000 diodes.

Figure 13:
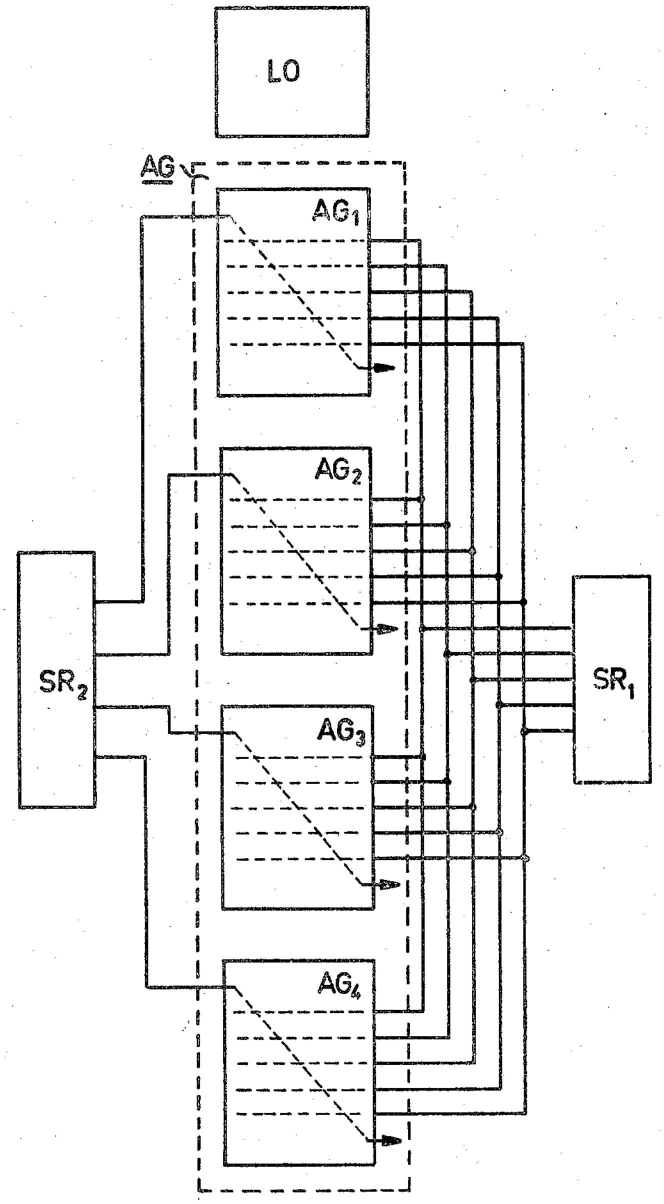

A different method of concentration in the control consists in that the subscriber's memory is read in coincidence while the two reading coincidents are produced by two counting circuits, or the gates which pass or stop these reading coincidents are controlled by counting circuits. The latter may be effected again either in the manner shown in FIGURE 11 or in the manner shown in FIGURE 12. The principle of this method is shown in FIGURE 13, in which it is assumed that the reading coincidents are supplied directly by two counting circuits $SR_1$ and $SR_2$. The subscriber's memory is sub-divided into four parts $AG_1$, $AG_2$, $AG_3$, $AG_4$, in each of which the states of a number of subscribers' sets (five in FIGURE 13) are recorded. At the instant $t_1$ of a pulse cycle, the counting circuit $SR_1$ conducts a reading coincident through the $r$-th line of each of the four paths of the subscriber's memory and the counting circuit $SR_2$ conducts the other reading coincident through all the lines of the $s$-th parts of the subscriber's memory. As a result, only the $r$-th line of the $s$-th part of the subscriber's memory is read. At the instant $t_1$ of the following pulse cycle, the counting circuit $SR_1$ conducts a reading coincident through the $(r+1)$-th line of each part of the subscriber's memory and the shift register $SR_2$ conducts the second reading coincident through all the lines of the $(s+1)$-th part of the subscriber's memory, so that now the $(r+1)$-th line of the $(s+1)$-th part is read. In this case $r+1$ should be interpreted as 1 if $r=5$ and $s+1$ as 1 for $s=4$. The lines of the subscriber's memory are consequently read in the sequence (1, 1), 2, 2), (3, 3), (4, 4), 5, 1), (1, 2), (2, 3), (3, 4), and so on.

Figure 14:
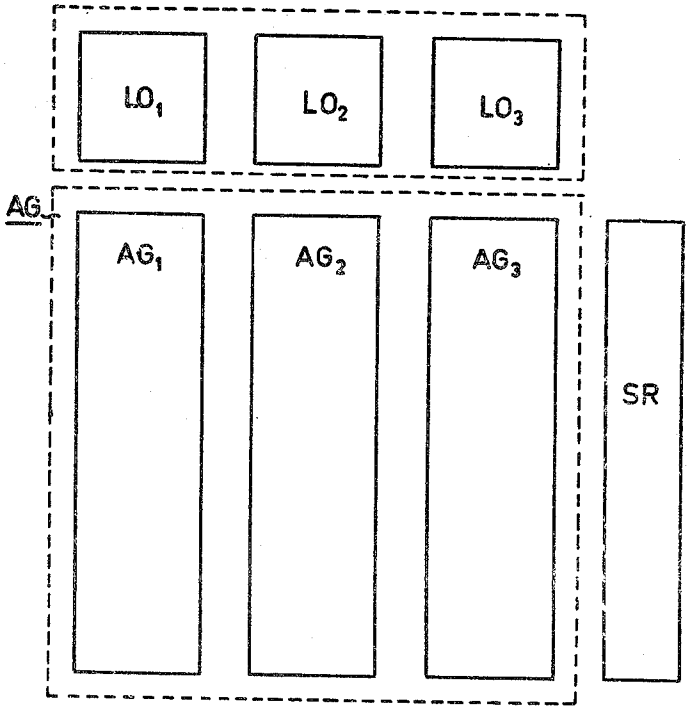
FIG. 14 illustrates a method by which the scanning cycle may be shortened.

The scanning cycle can be reduced considerably by each time testing a number of subscriber's sets simultaneously, as shown diagrammatically in FIGURE 14. The store elements individually associated with the subscriber's sets are provided in three matrices $AG_1$, $AG_2$, $AG_3$, which together form the subscriber's memory AG. At each instant $t_1$ are simultaneously read the state of a subscriber's set stored in the matrix $AG_1$ a subscriber's set stored in the matrix $AG_2$ and a subscriber's set stored in the matrix $AG_3$. These three items of information are produced in three logical members $LO_1$, $LO_2$ and $LO_3$, which at the instant $t_5$ offer their output information so that the three relative subscribers' sets are recorded in the three matrices $AG_1$, $AG_2$, and $AG_3$ in the state adapted to the information received and, if necessary, signal *a*, *b* or *c* are transmitted to the control member BO or a signal *a'* is transmitted to the counting circuit SR. So the control member BO should be constructed so that it can receive three items of information simultaneously, for example owing to the fact that it is provided with a number of buffer memories. In addition it is clear that the control member BO should also be constructed so that it delivers a signal which indicates whether buffer memories are free or not. In the latter case, the normal scanning should be discontinued, for example by stopping the clock pulses serving that purpose. Therefore, the assembly may be constructed so that the scanning is discontinued as soon as the control member is no longer capable of storing the items of information of the three logical members $LO_1$, $LO_2$, $LO_3$ simultaneously in buffer memories, but also so that the scanning is discontinued only when the control member BO is no longer capable of even receiving the information of one logical member. If at a given instant two or more logical members are available which are to transmit information to the control member, only one of them is admitted to the control member. In this case, the other logical members should of course write back the relative subscriber's set in the original state in the subscriber's memory. Further it is clear that the items of information originating from the various logical members may be given different priorities in the control member. Alternatively, the assembly may be constructed so that, if two or more logical members have to offer information simultaneously, these items of information are not transmitted to the control member simultaneously but after each other with a definite priority. The scanning should be discontinued until the instant at which all the logical members have transmitted their information to the control member.

Naturally, it is also possible to construct the scanning arrangement again in each of the above described manners.

What is claimed is:

1. An automatic telephone exchange comprising a plurality of subscribers sets, a plurality of first storage elements having reading, writing and signal wire means, means coupling each subscribers set to the writing wire means of a separate first storage element whereby the open and closed loop states of said subscribers sets are stored in the respective first storage elements, a plurality of second storage elements corresponding to each of said first storage elements, logical circuit means, counting circuit means, said second storage elements having reading, writing and signal wire means, means connecting the reading wire means of said first and second storage elements to said counting circuit means whereby said first storage elements are sequentially read and said second storage elements are read with their corresponding first storage elements, means connecting the signal wire means of said first and second storage elements to said logical circuit means, means connecting the writing wire means of said second storage elements to said logical circuit means, control means connected to said counting circuit means for interrupting the sequential reading of said first storage elements and their corresponding second storage elements and for reading a selected first storage element and its corresponding second storage elements, means connecting said control means to said logical circuit means, said logical circuit means comprising means responsive to signals on said signal wire means of said first and second storage elements in the absence of interruption of sequential reading of said first and second storage elements for applying signals according to a first predetermined program to said writing wire means of said second storage elements, and means responsive to signals on said signal wire means of said first and second storage elements in the presence of interruption of sequential reading of said first and second storage elements for applying signals according to a second predetermined program different from said first predetermined program to said writing wire means of said second storage elements.

2. An automatic telephone exchange comprising a plurality of subscribers sets, a matrix of a plurality of rows and columns of storage elements each having writing, reading and signal wire means, logical circuit means, counting circuit means, means connecting the reading wire means of said elements to said counting circuit means with each row of elements being separately connected whereby said rows of elements are sequentially read, means connecting the signal wire means of said elements to said logical circuit means with each column of elements being separately connected, means connecting said subscribers sets to the writing wire means of elements of one column, with the subscribers sets being connected to separate elements, means connecting the writing wire means of the elements of the remaining columns to said logical circuit means separately by column, means connecting the signal wire means of said elements to said logical circuit means separately by column, control means connected to said logical circuit means and counting circuit means for interrupting the sequential reading of said elements for the reading of a selected row and for applying an interruption signal to said logical circuit means indicating said interrupting of sequential reading, said logical circuit means comprising means responsive to signals read from said storage elements and the absence of said interruption signal for applying signals according to a first predetermined program to said writing wire means of said remaining elements, and means responsive to signals read from said storage elements and the presence of said interruption signal for applying signals according to a second predetermined program different from said first predetermined program to the writing wire means of said remaining storage elements.

3. An automatic telephone exchange comprising a plurality of subscribers sets, a matrix of a plurality of rows and columns of storage elements each having first writing, reading and signal wire means, logical circuit means, counting circuit means, means connecting the reading wire means of said elements to said counting circuit means with each row of elements being separately connected whereby said rows of elements are sequentially read, means connecting the first signal wire means of said elements to said logical circuit means with each column of elements being separately connected, means connecting said subscribers sets to the writing wire means of elements of one column, with the subscribers sets being connected to separate elements, means connecting the first writing wire means of the elements of the remaining columns to said logical circuit means separately by column, means connecting the signal wire means of said elements to said logical circuit means separately by column, said remaining storage elements having second writing wire means, means connecting said second writing wire means to said counting circuit means separately by row, said counting circuit means comprising means for applying pulses sequentially to said second writing wire means subsequent to reading of the respective row whereby signals are stored in said remaining elements by coincidence of signals on said first writing wire means and pulses on said second writing wire means, control means connected to said logical circuit means and counting circuit means for interrupting the sequential reading of said elements for the reading of a selected row and for applying an interruption signal to said logical circuit means indicating said interrupting of sequential reading, said logical circuit means comprising means responsive to signals read from said storage elements and the absence of said interruption signal for appplying signals according to a first predetermined program to said writing wire means of said remaining elements, and means responsive to signals read from said storage elements and the presence of said interruption signal for applying signals according to a second predetermined program different from said first predetermined program to the writing wire means of said remaining storage elements.

References Cited by the Examiner

UNITED STATES PATENTS

| | | | |
|---|---|---|---|
| 2,904,636 | 9/59 | McKim et al. | 179—18 |
| 2,912,511 | 11/59 | McKim | 179—18 |
| 2,952,742 | 9/60 | Kiyasu et al. | 179—18 |
| 3,032,747 | 5/62 | French | 179—18 |

ROBERT H. ROSE, *Primary Examiner.*

UNITED STATES PATENT OFFICE
CERTIFICATE OF CORRECTION

Patent No. 3,201,519 August 17, 1965

Mattheus Jacobus Schmitz

It is hereby certified that error appears in the above numbered patent requiring correction and that the said Letters Patent should read as corrected below.

Column 1, line 70, for "is" read -- in --; column 7, line 25, for "precent" read -- present --; column 8, line 26, for "29" read -- 28 --; column 10, line 27, for "countnig" read -- counting --; line 63, for "2,2)" read -- (2,2) --; line 64, for "5,1)" read -- (5,1) --; column 11, line 4, for "signal" read -- signals --.

Signed and sealed this 27th day of December 1966.

(SEAL)
Attest:

ERNEST W. SWIDER
Attesting Officer

EDWARD J. BRENNER
Commissioner of Patents